United States Patent
Wu

[11] Patent Number: 5,816,310
[45] Date of Patent: Oct. 6, 1998

[54] SUN SHIELD FOR AUTOMOBILE

[76] Inventor: David Yang Ling Wu, 15323 Regalado St., Hacienda Heights, Calif. 91745

[21] Appl. No.: 889,491

[22] Filed: Jul. 8, 1997

[51] Int. Cl.[6] .......................................................... B60J 1/20
[52] U.S. Cl. ....................................... 160/370.21; 296/136
[58] Field of Search ............................. 160/370.21, 368.1, 160/370.22; 296/136, 98

[56] References Cited

U.S. PATENT DOCUMENTS

| | | |
|---|---|---|
| 4,815,784 | 3/1989 | Zheng . |
| 4,825,889 | 5/1989 | Monteith .............................. 296/136 X |
| 4,858,985 | 8/1989 | Wojcik ..................................... 296/136 |
| 4,948,191 | 8/1990 | Cao ................................. 160/370.21 X |
| 4,972,892 | 11/1990 | Yeh ................................. 160/370.21 X |
| 5,328,230 | 7/1994 | Curchod ................................... 296/136 |
| 5,364,155 | 11/1994 | Kuwahara ................................ 296/136 |
| 5,388,833 | 2/1995 | Yang . |
| 5,401,074 | 3/1995 | Timerman ....................... 160/370.21 X |
| 5,429,406 | 7/1995 | Huang . |
| 5,655,810 | 8/1997 | Shikler ............................ 160/370.21 X |

*Primary Examiner*—Blair Johnson

[57] ABSTRACT

A sun shield for automobile comprises a top, windshield, front, left, right and rear sunshade portions, and completely blocks the sun rays that shine to the automobile from different directions. The top sunshade portion is supported by two X deposed steel wires which straighten the top of the top sunshade portion without drooping. The spacers keep the top of the sunshade portion apart from the top of the automobile to establish a ventilating space which stops the transmittal and radiation of the sun heat. The sun shield is convenient in folding and extending.

8 Claims, 6 Drawing Sheets

SUN SHIELD FOR AUTOMOBILE

BACKGROUND OF THE INVENTION

The present invention relates to an improved protection shield for automobiles, more particularly relates an improved sun shield for automobiles.

The temperature in the interior of an unoccupied vehicle exposed to the sun is very high in the summer, high heat is not only uncomfortable for people getting into the vehicle but it also cause damage to the vehicle, especially to the plastic parts. A number of vehicle covers have been developed in recent years for various purposes. Most of these covers are designed to reduce the high heat in the interior of a vehicle.

U.S. Pat. No. 4,815,784 to Yu Zheng discloses a collapsible elongated sun shield. It includes two collapsible flexible loops covered by a fabric covering material. When it is used for blocking the sun rays, the sun shield is in the extended position and is located inside of the windshield of the automobile. When it is desire to remove the sun shield and store it for late use, the two fabric covered loops are folded and twisted into a much smaller series of concentric loops and layers of fabric. The advantage of this sun shield is convenient in folding and extending of the sun shield. This sun shield can block the sun rays through the front windshield only. The sun rays still can shine into the interior of the automobile through the side windows and rear window. Also, a lot of heat energy of sun rays is transmitted into the interior of the automobile by the conduction of heat and radiation of heat. So the function of this sun shield for reducing the heat in the interior of the vehicle is limited.

U.S. Pat. No. 5,429,406 to Ping-Jung Huang discloses a sun shield for automobiles, includes an upper cover having a rectangular portion with a first enlarged portion and a second enlarged portion at two short sides of the rectangular portion; two rods at both long sides of the rectangular portion, a first flap and a second flap at both long sides of the rectangular can be fixed on the two rods. In assembly, the upper cover is disposed on the top of an automobile, the first and second enlarged portions extend downward to cover the windshield and the rear window of the automobile, the first flap and the second flap cover the side windows of the automobile. This sun shield works better in blocking the sun rays and reducing the heat in the interior of the automobile. However, the upper cover having a rectangular portion droops on the top of the automobile by gravity with no space between the upper cover and the top of the automobile. A considerable amount of sun heat is transmitted into the interior of the automobile by way of conduction and raises the temperature in the interior of the automobile. Beside, it is inconvenient in extending it for use and folding it for storage and late use. Another disadvantage is that on a windy day flaps and enlarged portions would be blown open, resulting in loss of the function of blocking sun rays. It is also easily stolen by a thief.

U.S. Pat. No. 5,388,833 to Shyue-Jong A. Yang discloses a sun shield having an umbrella shape. This opened sun shield is fixed on the top of the automobile to block the sun rays. A substantial space exists between the sun shield and the top of the automobile, allowing air flow. This prevents the conduction of the sun heat into the interior of the automobile. However, this sun shield covers the top of the automobile only without protection for the side windows, windshield and rear window, the oblique sun rays from the front, rear and side directions cannot be blocked, therefore the reduction of the heat in the interior of the automobile is imperfect. Beside, the structure of this sun shield is complex and the operations involved in extending, folding the sun shield and the fixing it on the top of the automobile are cumbersome.

SUMMARY OF THE INVENTION

It is the primary object of the present invention to provide a sun shield for automobiles which possesses an excellent function in blocking the sun rays, not only the sun rays shining upon the top of the automobile but also the oblique sun rays shining upon the windshield, side windows and rear window. In addition, the sun shield can block conduction and radiation of sun heat outside the automobile.

It is another object of the present invention to provide a sun shield with simple structure, easy manufacture and low cost.

In order to accomplish the objects of the present invention, a sun shield comprises:

A top sunshade portion is made by a flexible sheet. The shape of the top sunshade portion matches the shape of the top of the automobile. Two resilient steel wires were deposited on the diagonal lines of the top sunshade portion respectively and connect therein. The boundary of the top sunshade portion extends downward to define an enclosing fence which is made by a ventilating flexible sheet;

A front sunshade portion is made by a flexible sheet. The shape of it matches the shape of the windshield of the automobile, the upside of the front sunshade portion is connected with the bottom-side of the enclosing fence;

A left and a right sunshade portions are made by a flexible sheet. The shapes of them match the shapes of the left and right windows of the automobile respectively, the upside of the left and right sunshade portions are connected with the bottom-side of the enclosing fence, the front sides of the left and right sunshade portions are connected with the left and right sides of the front sunshade portion;

A rear sunshade portion having an elastic rope is made by a flexible sheet. The shape of it matches the rear window of the automobile, the upside of the rear sunshade portion is connected with the bottom-side of the enclosing fence, the left and right sides of the rear sunshade portion are connected with the rear sides of the left and right sunshade portions, the bottom side of the rear sunshade portion has a flange projecting from the bottom of it, the two ends of the elastic rope are connected to the two bottom comers of the rear sunshade portion respectively.

Left and right rings are made by elastic rope. The shapes of them match the left and right rear mirrors of the automobile respectively, the left and right rings are connected at the left bottom corner and right bottom corner of the front sunshade portion respectively.

Spacers, which are located at and connected to the four corners and the center of the top sunshade portion.

An alternative of present invention, the bottom side of the rear sunshade portion extends rearward to form a swallowtail end, a connecting structure is attached to the swallowtail end.

Another alternative of present invention, the sun shield of present invention includes a bag. The back of the bag has a connecting structure used for connecting with the trunk lid. The end of the swallow-tailed of the rear sunshade portion is separably connected with the bag. The sun shield can be folded to put in the bag.

Another alternative of the present invention, the left and right sunshade portions have elastic ribbons which are located on the bottom sides of the left and right sunshade portions respectively.

The advantages of the present invention are obvious compared to the sun shields described in the prior arts. The sun shield of present invention covers the top, windshield, rear window and side windows of the automobile to block the sun rays without shining into the interior of the automobile. In the meantime a ventilating space exists between the sun shield and the top of the automobile allowing air flow through it. The space blocks the heat conduction to prevent the transmittal of the sun heat into the interior of the automobile. The sun shield is made of light reflective material which blocks radiation of sun heat. Thus, the sun shield of present invention possesses a superior capacity of reducing the temperature in the interior of the automobile. The sun shield of present invention also can be folded into a small volume for being stored in a bag or a trunk of the automobile. The operations of extending or folding of the sun shield of present invention is easy. The top sunshade portion is supported by two X disposed steel wires which straighten the top of the top sunshade portion without drooping. The spacers keep the top of the top sunshade portion apart from the top of the automobile to establish a ventilating space which stops the transmittal of sun heat outside of the automobile efficiently. The sun shield of present invention has a pair of left and right elastic rings which can be put on left and right rear view mirrors, in the mean time the flange and rope of the rear sunshade portion are pressed by the trunk lid of the automobile, thus the sun shield covers the automobile firmly without worrying about windblown or stolen by a thief.

DETAIL DESCRIPTION OF THE PREFERRED EMBODIMENTS

With reference to the drawings the present invention is given to the following detailed description. As such, those skilled people in the art will appreciate that the conception, upon which this disclosure is based, may readily be utilized as a basis for the designing of other structures, methods and systems for carrying out the several purposes of the present invention. It is essential, therefore, that the claims be regarded as including such equivalent constructions insofar as they do not depart from the spirit and scope of the present invention.

Figure 1:
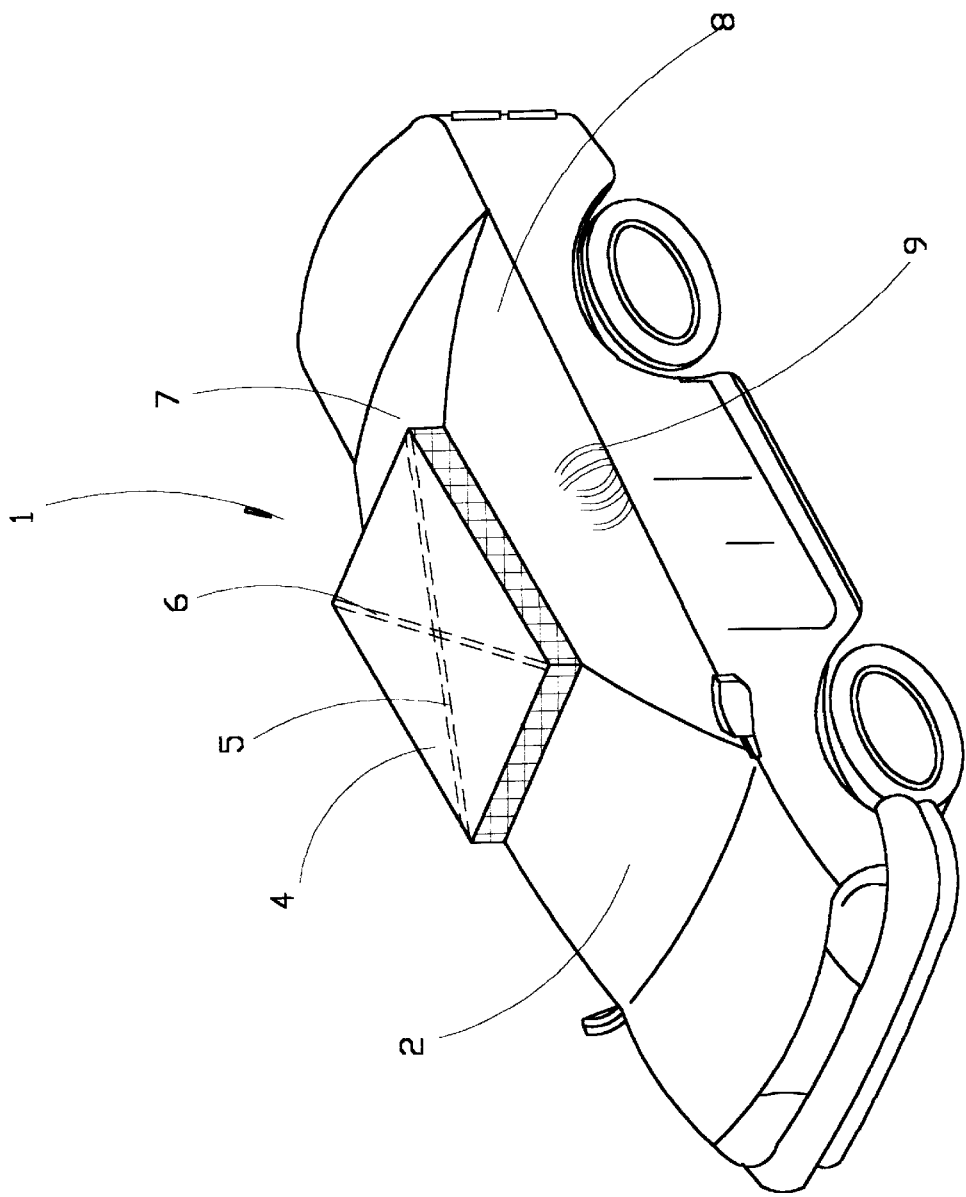
FIG. 1 is a perspective view of the sun shield of the present invention which is covered on the automobile.
Figure 2:
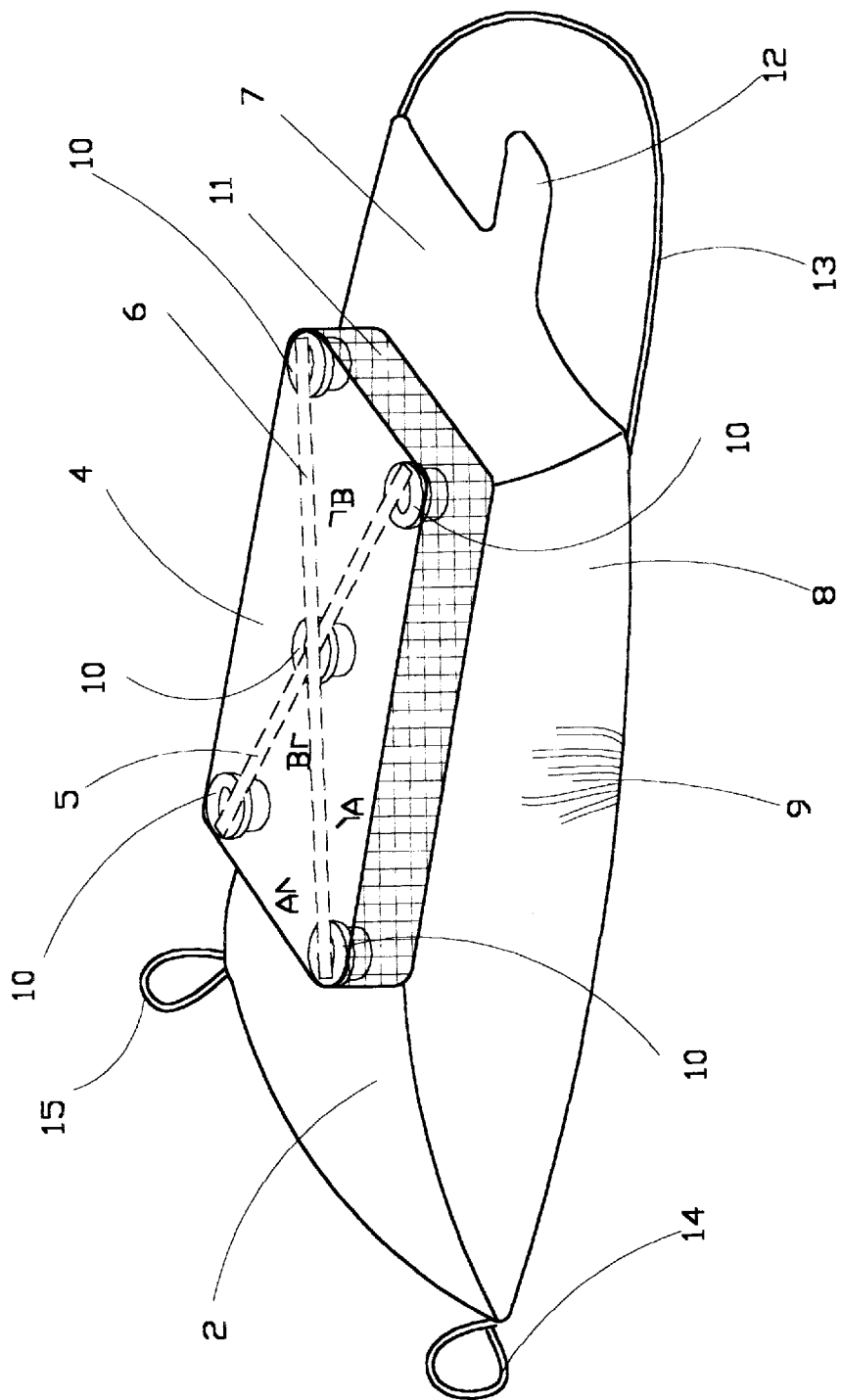
FIG. 2 is a perspective view of the sun shield of the present invention shown in the FIG. 1.
Figure 3:
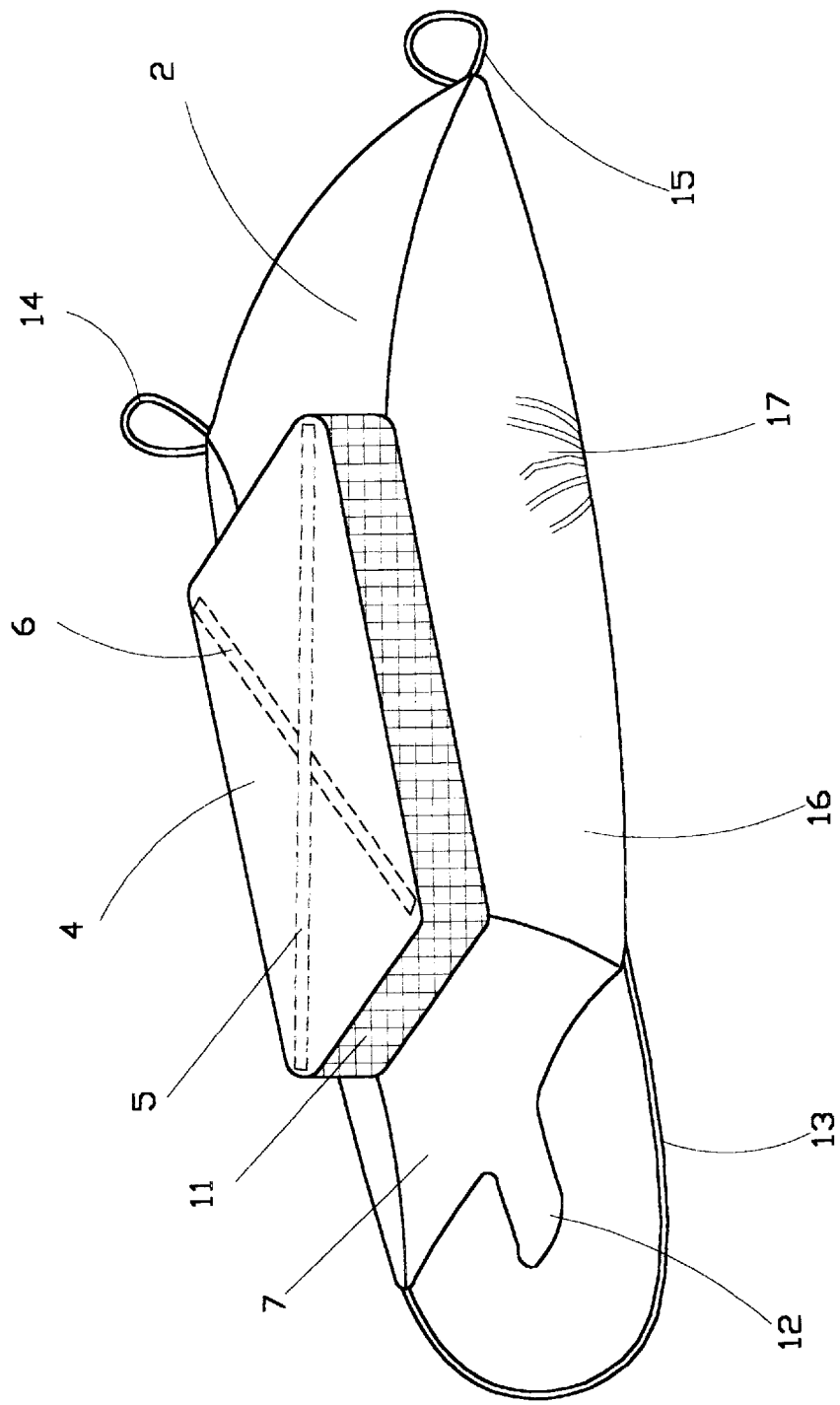
FIG. 3 is a perspective view of the sun shield of the present invention, view from the opposite side of the sun shield shown the FIG. 2.
Figure 4:
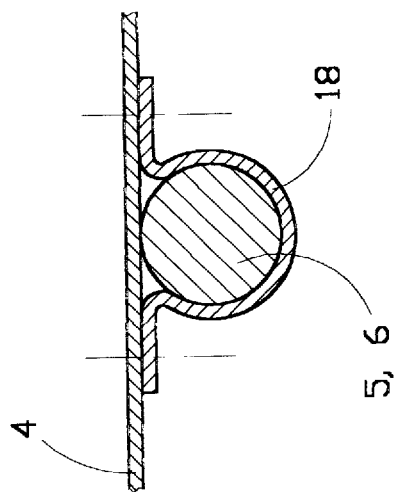
FIG. 4 is a cross-section view taken along the line A—A shown in FIG. 2.

With reference to the drawings and in particular to FIGS. 1, 2, 3, 4, 5 thereof, the sun shield 1 for automobile has a top sunshade portion 4, the shape of it matches the shape of the top of the automobile. Two resilient steel wires 5, 4, are deposited on the diagonal lines of the top sunshade portion 4 respectively and connected therein. A kind of connection is shown in FIG. 4, the resilient steel wires 5, 6 are covered by strips of cloth 18 and sewed on the top sunshade portion 4. The resilient steel wires 5, 6 are not fixed together but can turn with respect to each other. The boundary of the top sunshade portion 4 extends downward to define an enclosing fence 11 which is made by a ventilating flexible sheet.

A front sunshade portion 2 matches the shape of the windshield, the upside of the front sunshade portion 2 is connected with the bottom-side of the enclosing fence 11.

A left sunshade portion 16 and a right sunshade portion 8 have shapes that match shapes of the left window and right window of the automobile respectively. The upside of the left and right sunshade portions 16, 8 are connected with the bottom-side of the enclosing fence 11; the front-sides of the left and right sunshade portions 16, 8 are connected with the left and right sides of the front sunshade portion 2.

A rear sunshade portion 7, the shape of it 7 matches the shape of the rear window, the upside of the rear sunshade portion 7 is connected with the bottom-side of the enclosing fence 11, the left and right sides of the rear sunshade portion 7 are connected with the rear sides of the left and right sunshade portions 16, 8, the bottom-side of the rear sunshade portion has a flange 12 projected from the bottom of it 7, the portion 7 has a elastic rope 13 with two ends which connect to the two bottom corners of the rear sunshade portion 7 respectively.

The top, front, rear, left and right sunshade portions 4, 2, 7, 16, 8 are made by a flexible sheet. A light color is preferred for the sun shield 1. In the present embodiment the face of the sheet is silver and the back of the sheet is black. The silver color has perfect ability of reflecting sun heat and the black color has perfect ability for absorbing the leaking sun heat, so this kind of sheet possesses perfect ability for preventing radiation of sun heat.

Figure 5:
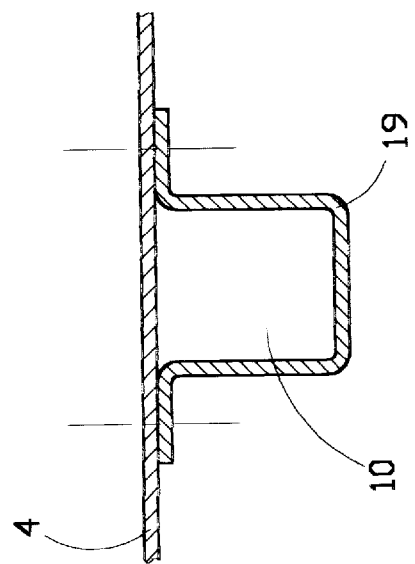
FIG. 5 is a cross-section view taken along the line B—B shown in FIG. 2.

Spacers 10, which are located at four corners and the center of the top sunshade portion 4. As shown in FIG. 5, the spacer 10 can be wrapped up by a sheet 19 then sewed on the top sunshade portion 4. Also other methods can be used for the connection, such as bonding agent or rivet. The spacer 10 can be made by wood or plastic material. Higher spacers 10 make the space higher between the top of the automobile and the top sunshade portion 4 to benefit the ventilation. But a higher spacer 10 also brings difficulty in folding the sun shield 1.

As shown in FIGS. 2 and 3, A left ring 15 and a right ring 14 made by elastic rope, the shapes of them match the left and right rear mirrors respectively. The left and right ring 15, 14 are connected at the left bottom corner and right bottom corner of the front sunshade portion 2 respectively.

Figure 6:
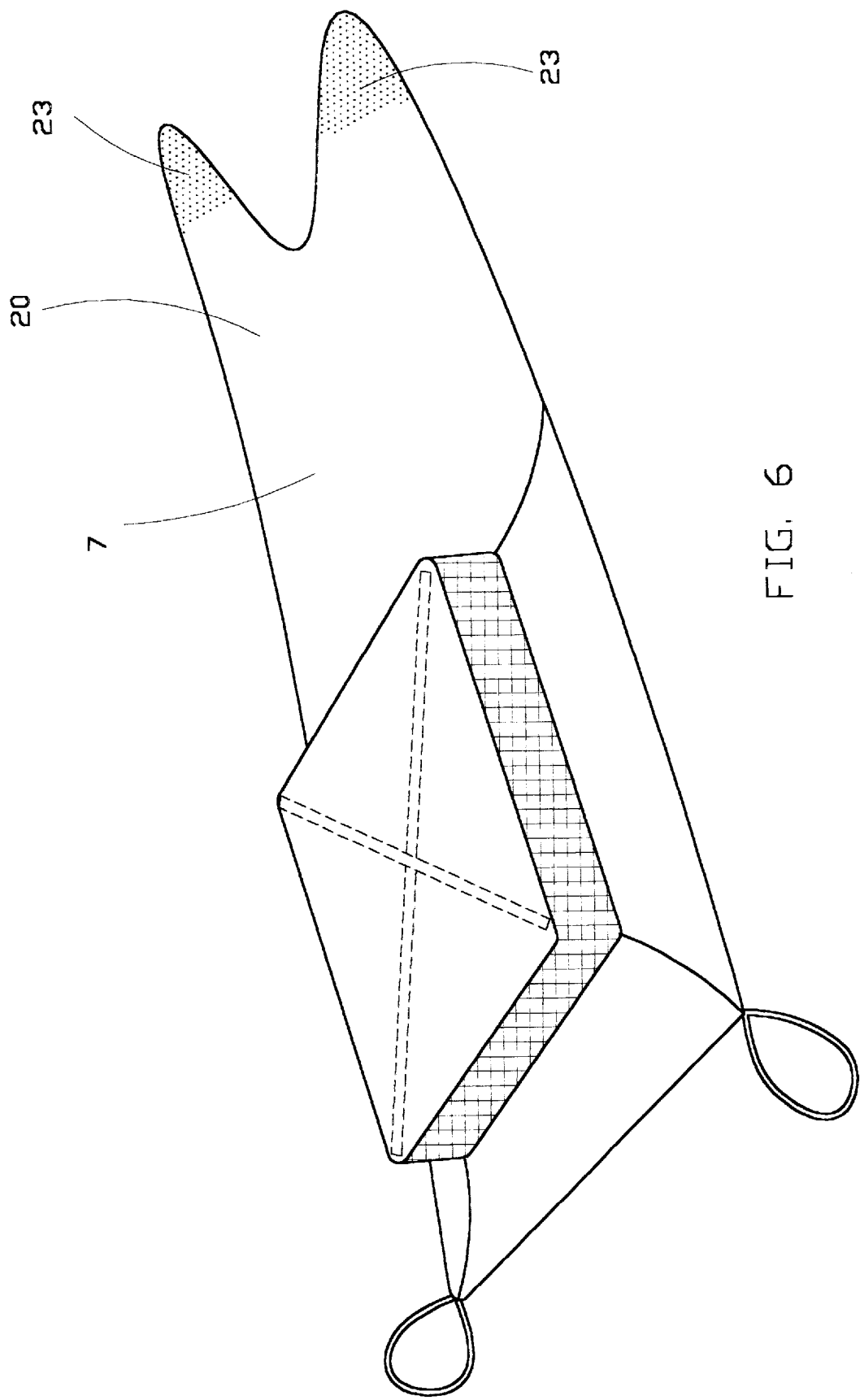
FIG. 6 is a perspective view of the alternative of the sun shield of the present invention.
Figure 8:
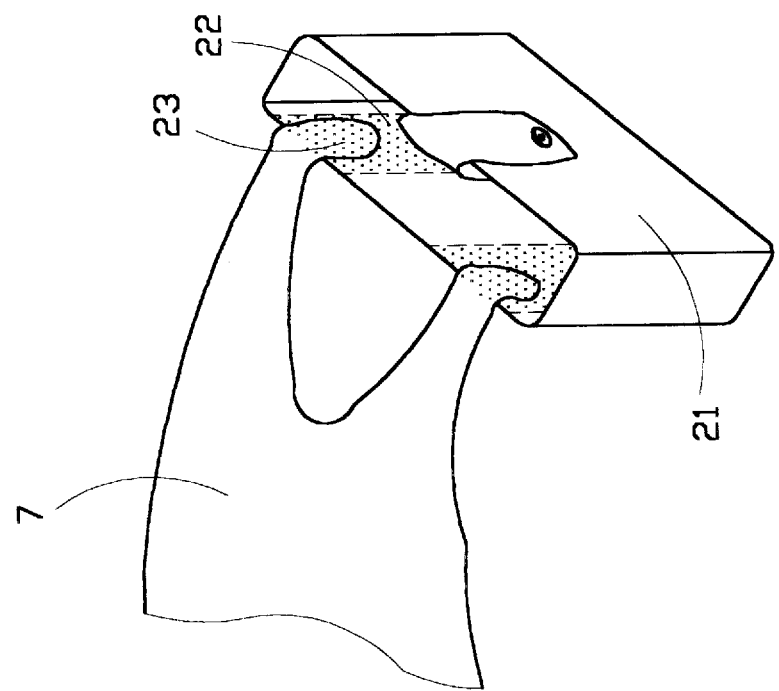
FIG. 8 is a perspective view of the rear portion of the alternative of the sun shield of the present invention.
Figure 7:
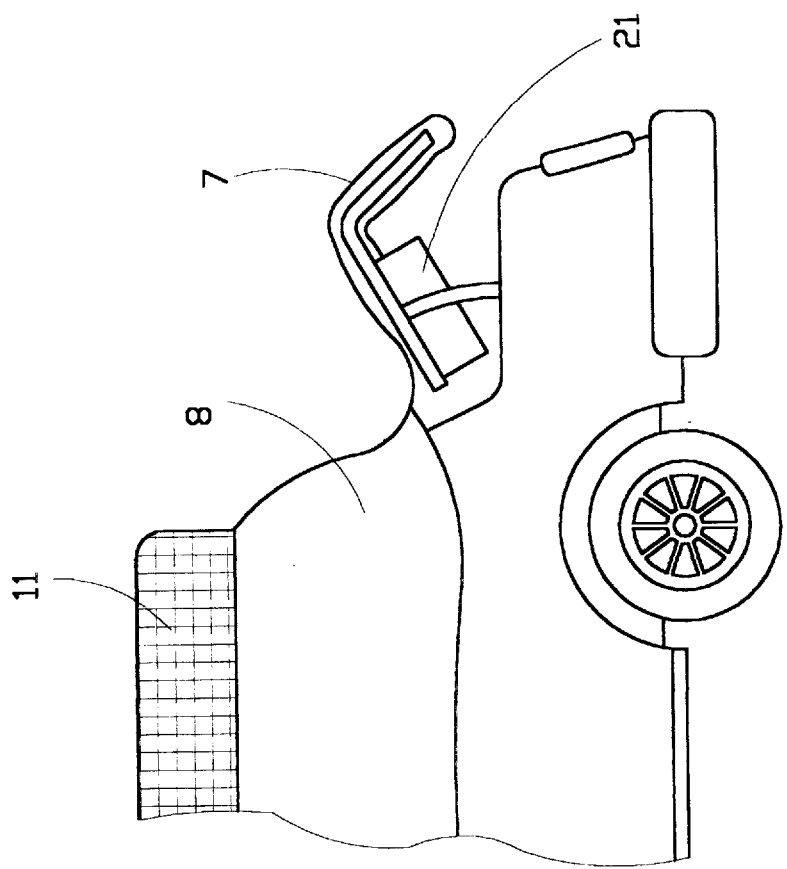
FIG. 7 is a portion side view of the alternative of the sun shield of the present invention shown in the FIG. 6, the trunk lid of the automobile is opened.

FIGS. 6, 7, 8 show an alternative of the sun shield of the present invention. The rear sunshade portion 7 extends rearward to form a swallowtail end 20 which has sticking pieces 23. The alternative of the sun shield includes a bag 21, the back of the bag 21 has a connecting structure 22 used for connecting with the trunk lid of the automobile. In the present embodiment the connecting structure 22 is a kind of sticking sheet which includes two sticking pieces, one sticking piece has many small plastic hooks, another sticking piece has many small plastic rings, two pieces can be sticked together when they touch together and two pieces can be separated by pulling. This kind of sticking sheet can be bought in the market. One sticking piece 22 of the sticking sheets is connected on the back of the bag 21, and another sticking piece of the sticking sheet (not shown in the drawing) is connected on the inner face of the trunk lid of the automobile. The bag 21 can be separably connected to the trunk lid by the sticking sheet 22 (as shown in the FIG. 7). The swallow-tailed end 20 of the rear sunshade portion 7 also has a sticking piece 23, then it 7 is separably connected with the bag 21 by the sticking piece 23. The sun shield 1 can be folded to put in the bag 21. When the bag 21 is not used, the swallow-tailed end 20 of the rear sunshade portion 7 can be separably connected with the trunk lid of the automobile by the sticking piece 23.

Another alternative of the present invention, the left and right sunshade portions 16, 8 have elastic ribbons 17, 9 which are located on the bottom sides of the left and right sunshade portions 16, 8 respectively. Thus, the left and right sunshade portions 16, 8 can be elastically enlarged for suiting different model automobiles.

The process of the usage of the sun shield of the present invention is described as following:

Take out the folded sun shield 1 from a bag or the trunk of the automobile, extend and cover it on the automobile, put the left and right elastic rings 15, 14, on left and right rear mirrors respectively. Open the trunk lid, put the elastic rope 13 on the trunk lid, then close the trunk lid, the elastic rope 13 and the flange 12 are gripped by the trunk lid.

The top sunshade portion 4 is supported by the X disposed steel wires 5, 6. The top sunshade portion 4 keeps a space from the top of the automobile by the spacers 10, the air can flow through the space as the enclosing fence 11 is made by a ventilating flexible sheet.

The process of the usage of the alternative of the sun shield of the present invention is described as following:

Take out the folded sun shield 1 from the bag 21 or the trunk of the automobile, extend and cover it 1 on the automobile, put the left and right elastic rings 15, 14 on left and right rear mirrors respectively, pull the swallow-tailed end 20 of the rear sunshade portion 7 forward rear and across the trunk lid of the automobile, stick the swallow-tailed end 20 to the trunk lid of the automobile, then close the trunk lid of the automobile. The lock of the truck is appeared from the space defined by the swallowtail 20. If the bag 21 is used, stick the bag 21 on the back of the trunk lid, then take the sunshade 1 out of the bag 21, extend the sunshade 1 across the trunk lid, cover the sun shield 1 on the automobile, put the left and right elastic rings 15, 14 on left and right rear mirrors respectively, then close the trunk lid, the lock of the trunk is appeared from the space defined by the swallowtail.

It is convenient in folding the sun shield 1. First take off the left and right elastic rings 15,14 from the left and right rear mirrors, then take off the sun shield 1 from the automobile, collect the sun shield 1, close the X disposed steel wires 5, 6 to become a pair of parallel lines, fold the sun shield 1, the parallel wires 5, 6 can be banded for folding the sun shield 1 smaller, then put the folded sun shield 1 into a bag or into the trunk of the automobile.

The sun shield 1 of the present invention has a superior efficiency in blocking sun rays and reducing the hot temperature in the interior of the automobile. The sun rays are blocked outside of the automobile by the sun shield 1. The silver color of the surface of the sun shield 1 reflects most part of the radiation of the sun heat and the black back face blocks the leaking part of the radiation of the sun heat. The space with the flowing air between the top of the automobile and the top sunshade portion 4 prevent the heat conduction. The sun shield 1 can reduce about 50-degree Fahrenheit in the interior of the automobile under the sun shin in June of Los Angeles as the testing result.

I claim:

1. A sun shield for automobile comprising:
    a top sunshade portion including:
        a flexible sheet for shielding sunlight, said flexible sheet including
        a foldable support means comprising two X disposed resilient steel wires and spacers for supporting said flexible sheet above said top of the automobile to define a space, therebetween
        a ventilation means made by a ventilating flexible sheet having ventilating openings therein and extending downwardly along the periphery of said flexible sheet to allow air circulation between said flexible sheet and the top of the auto:
    a front sunshade portion made by a flexible sheet having a shape matching a windshield of the automobile, said front sunshade portion having an upside, a left-side and right-side, said upside of the front sunshade connected with a lower portion of said ventilating flexible sheet;
    a left and right sunshade portions each made by a flexible sheet having shapes matching the left and right windows of the automobile respectively, said left and right sunshade portions having upsides, front-sides and rear-sides, said upsides of the left and right sunshade being connected with respective lower side portions of said ventilating flexible sheet, said front sides of the left and right sunshade portions respectively being connected with said left and right-sides of the front sunshade portion;
    a rear sunshade portion made by a flexible sheet having a shape matching a rear window of the automobile, said rear sunshade portion having an upside, a left-side, a right-side, a bottom side with a flange and a elastic rope, said upside of the rear sunshade being connected with a lower rear portion of said ventilating flexible sheet, said left and right-sides of the rear sunshade portion being connected with respective said rear sides of the left and right sunshade portion;
    a left ring and a right ring made by elastic rope having shapes matching left and right rear view mirrors of the automobile respectively and being located at a left bottom corner and right bottom corner of a said front sunshade portion, respectively.

2. The sun shield for automobile as claimed in claim 1, wherein said rear sunshade portion extends rearward to form a swallow-tailed end.

3. The sun shield for automobile as claimed in claim 2, additionally including a bag, a back of said bag having a connecting structure used for separably connecting the bag to the trunk lid, said sun shield being separably connected to said bag.

4. The sun shield for automobile as claimed in claim 1, wherein said flexible sheet has a silver face and black back.

5. The sun shield for automobile as claimed in claim 2, wherein said flexible sheet has a silver face and black back.

6. The sun shield for automobile as claimed in claim 1, wherein said left and right sunshade portions each additionally having elastic ribbon.

7. The sun shield for automobile as claimed in claim 2, wherein said left and right sunshade portions each additionally having elastic ribbon.

8. The sun shield for automobile as claimed in claim 1, wherein said resilient steel wire being covered by a strip of cloth and sewed on the top sunshade portion, said spacer being wrapped up by a sheet and sewed on the top sunshade portion.

\* \* \* \* \*